United States Patent
Sur et al.

(10) Patent No.: US 10,795,743 B2
(45) Date of Patent: Oct. 6, 2020

(54) COMPUTING DEVICE NOTIFICATION MANAGEMENT SOFTWARE

(71) Applicant: salesforce.com, inc., San Francisco, CA (US)

(72) Inventors: Abhijit Sur, Highlands Ranch, CO (US); Charles Hart Isaacs, Annapolis, MD (US)

(73) Assignee: salesforce.com, inc., San Francisco, CA (US)

( * ) Notice: Subject to any disclaimer, the term of this patent is extended or adjusted under 35 U.S.C. 154(b) by 213 days.

(21) Appl. No.: 15/985,186

(22) Filed: May 21, 2018

(65) Prior Publication Data

US 2019/0354428 A1 Nov. 21, 2019

(51) Int. Cl.
*G06F 11/00* (2006.01)
*G06F 11/07* (2006.01)

(52) U.S. Cl.
CPC ........ *G06F 11/0709* (2013.01); *G06F 11/006* (2013.01); *G06F 11/0772* (2013.01); *G06F 11/0793* (2013.01)

(58) Field of Classification Search
CPC ............... G06F 11/006; G06F 11/0709; G06F 11/0772; G06F 11/0793
See application file for complete search history.

(56) References Cited

U.S. PATENT DOCUMENTS

| | | | |
|---|---|---|---|
| 7,469,279 B1* | 12/2008 | Stamler | H04L 41/0672 709/220 |
| 7,953,808 B2 | 5/2011 | Sharp et al. | |
| 2004/0150519 A1 | 8/2004 | Husain et al. | |
| 2006/0230395 A1 | 10/2006 | Paul et al. | |
| 2007/0036330 A1 | 2/2007 | Wagner et al. | |
| 2007/0298758 A1 | 12/2007 | Verma et al. | |
| 2007/0299943 A1* | 12/2007 | Ogle | G06F 11/0748 709/221 |
| 2013/0336105 A1* | 12/2013 | Myrah | H04L 43/0817 370/216 |
| 2016/0154692 A1* | 6/2016 | Heinz | G06F 11/0772 714/2 |
| 2018/0004180 A1* | 1/2018 | Kar | G06F 8/65 |

\* cited by examiner

*Primary Examiner* — Joshua P Lottich
(74) *Attorney, Agent, or Firm* — Kowert, Hood, Munyon, Rankin & Goetzel, P.C.

(57) ABSTRACT

Techniques disclosed herein relate to managing notifications to a user associated with a computing device. The notifications correspond to a response to an indication of an exception condition on the computing device. The response to the exception condition includes a plurality of steps, including computer-implemented steps in which data objects output a plurality of notifications for the user. These notifications are processed by a notification choreographer and used to prepare a unified status communication. The unified status communication is output to the user and depicts information corresponding to a plurality of the notifications.

20 Claims, 8 Drawing Sheets

COMPUTING DEVICE NOTIFICATION MANAGEMENT SOFTWARE

BACKGROUND

Technical Field

This disclosure relates generally to managing user notifications relating to responses to exception conditions reported by computing devices.

Description of the Related Art

Increasingly, embedded devices include computer systems that communicate with remote computer systems to send information (e.g., information about errors or malfunctions, other messages) about the embedded devices to the remote computer systems and to receive commands from the remote computer systems. Many of these embedded devices, for example, report malfunctions to the remote computer system in order for the remote computer system to be used to resolve the malfunction. However, as more and more embedded devices are built and deployed, the amount of communication between these devices and the remote computer systems with which they communicate and the amount of communication from the remote computer systems to users about these devices has also increased.

SUMMARY

The present disclosure concerns the management of notifications that are sent to a user concerning a computing device. An exemplary computer system may communicate with a plurality of embedded devices, including a particular embedded device that sends an indication to the computer system about an exception condition that previously occurred, is currently occurring, or will/is expected to occur at that device. The computer system performs steps that are part of a response to the exception condition, including a plurality of steps that are performed using data objects stored on the computer system. The computer system may run software referred to as a "notification choreographer module" that receives notifications as a result of these steps being performed using data objects, and publishes events corresponding to at least some of the received notifications to an event bus. The notification choreographer module detects events on the event bus and stores notification indications corresponding to the detected events in a user notification object. The user notification object is used to prepare a unified status communication that is output to a user associated with the particular embedded device. The unified status communication depicts information corresponding to the notification indications stored in the user notification object. The unified status communication can be output to the user via any of a number of channels in any of a number of formats. In various embodiments, the unified status communication depicts information for all notification indications stored by the user notification object. Storing the notification indications in the user notification object thus allows a message to be presented to the user that includes information corresponding to multiple notifications made as part of the response. This paradigm may represent a scalable approach to handling a large number of embedded devices (and/or other computing devices).

Figure 1:
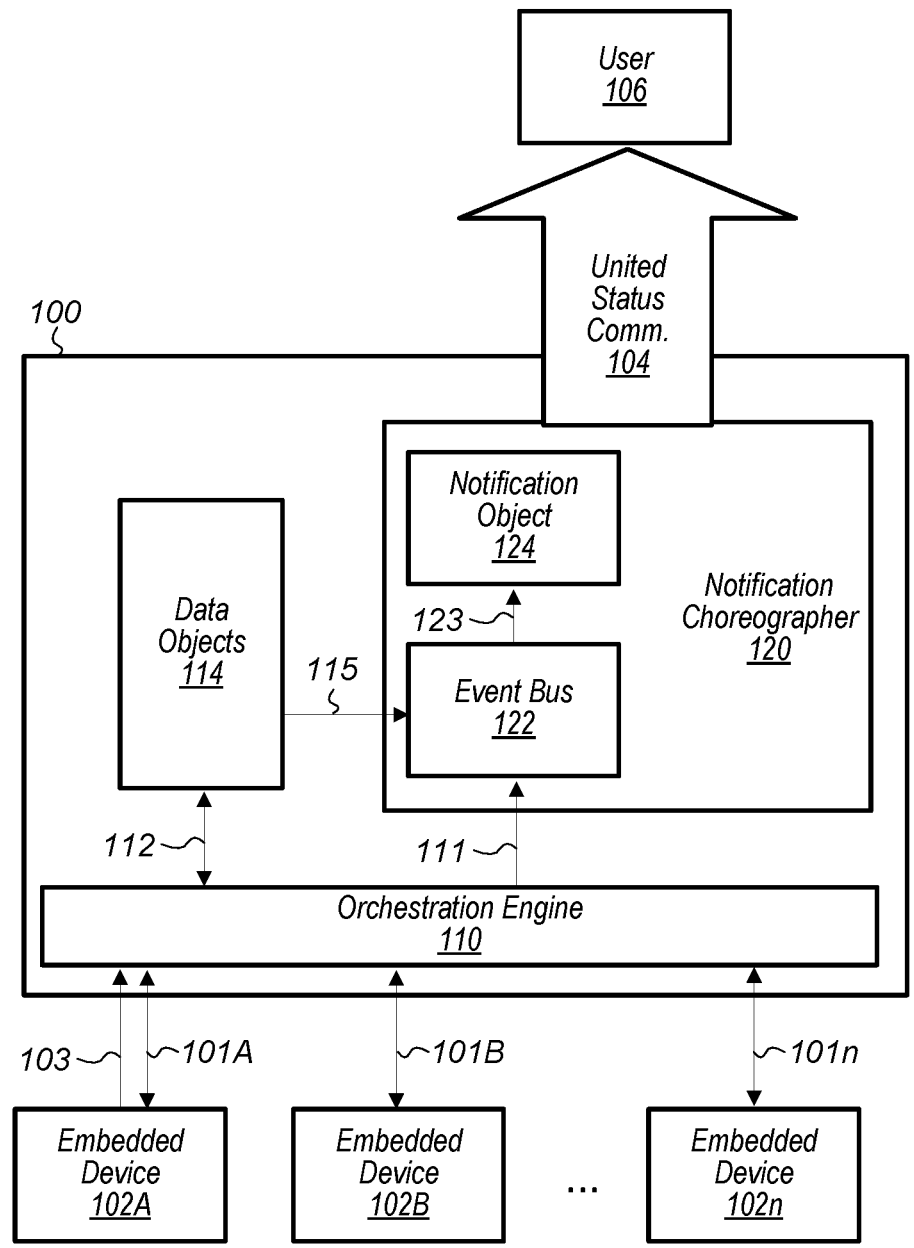
FIG. 1 is a block diagram illustrating an embodiment of a computer system configured to output a unified status communication.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" embedded devices would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram of an exemplary embodiment of a computer system 100 communicating with one or more computing devices (e.g., embedded devices 102) and one or more users 106 is depicted. After receiving an indication 103 of an exception condition from a particular embedded device 102A, computer system 100 prepares a unified status communication 104 to be output to a user 106 as discussed herein.

As discussed herein, computing system 100 communicates with one or more computing devices, including receiving indication 103. In the embodiments discussed herein, these computing devices are embedded devices 102. However, it will be understood that the techniques disclosed herein are not limited to just embedded devices. Embedded devices 102 are devices with one or more primary function that includes a computer system configured to support those primary functions. In various embodiments, embedded devices 102 include mechanical and/or electrical components configured to perform their primary functions and the embedded computer system performs functions including but not limited to controlling the mechanical and/or electrical components, gathering information (e.g., via sensors) about the status of the mechanical and/or electrical components, communicating with other computer systems (including computer system 100) to receive commands and/or information from the other computer systems. In various embodiments, the plurality of embedded devices 102 are internet of things devices. In various embodiments, each embedded device is configured to communicate with computer system 100 via a local area network and/or wide area network (e.g., the Internet). The embedded devices 102 may communicate with computer network 100 over any of a number of wired (e.g., Ethernet) and/or wireless (e.g., WiFi, cellular) mediums. In some embodiments, some or all of the embedded device 102 are remote from one another and computer system 100. Examples of embedded devices 102 include but are not limited to smart appliances (e.g., smart refrigerators), home automation devices, media devices, manufacturing devices, infrastructure management devices (e.g., systems that control the operation of an off-shore wind farm), wearable devices, automobiles, climate control devices, agricultural devices, medical devices, etc. Computer system 100 may communicate with any number of embedded devices 102, shown in FIG. 1 as embedded device 102A, embedded device 102B, and embedded device 102n.

Indication 103 is received from a particular embedded device 102A. Indication 103 is indicative of an exception condition that previously occurred, is currently occurring, or will/is expected to occur at the particular embedded device 102A. As used herein "exception condition" is defined as any condition at an embedded device 102 (or other computing device) for which a response is appropriate. What conditions at an embedded device 102 constitute an exception condition may be defined by an entity that manages the response, the manufacturer of the embedded device 102, etc. For example, as discussed herein with connection to FIGS. 3A, 3B, 7A, and 7B, the indication 103 relates to the exception condition that the temperature inside a smart refrigerator has exceeded 50 degrees Fahrenheit. In various instances, an exception condition is related to a malfunction in the particular embedded device 102A and ones of the plurality of steps in the response to the exception condition include steps to remedy the malfunction. In other instances, exception condition is an indication that regular service or maintenance (e.g., changing a water filter) should be performed on the particular embedded device 102A. Thus, while an exception condition may be an error occurring at embedded device 102, it is not necessarily an error in other instances. Indication 103 may be in any of a number of formats including but not limited to a message, an interrupt, a notification, etc. and may be communicated along any of a number of mediums including wireless and/or wireless communications mediums.

Figure 4:
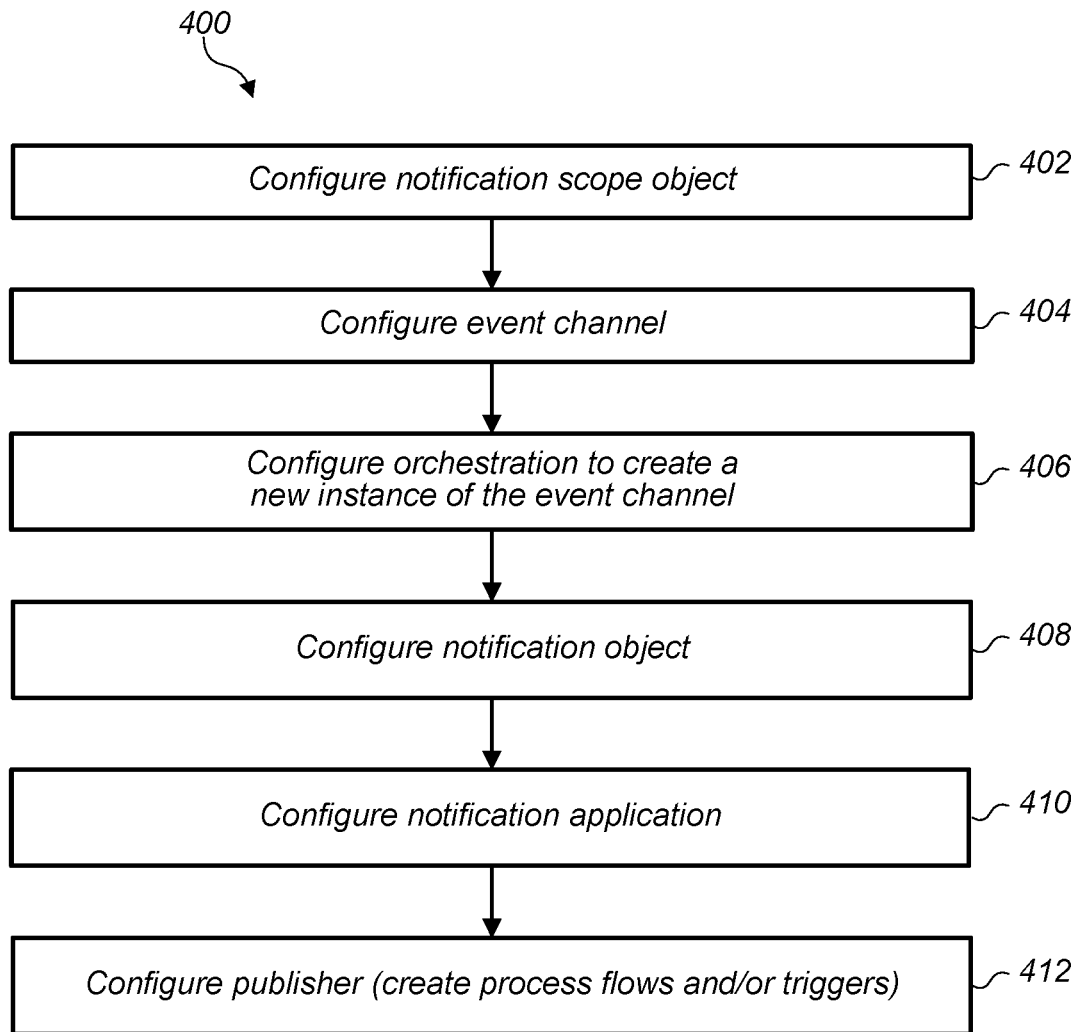
FIG. 4 is a flowchart illustrating an embodiment of a notification configuration method in accordance with the disclosed embodiments.
Figure 5:
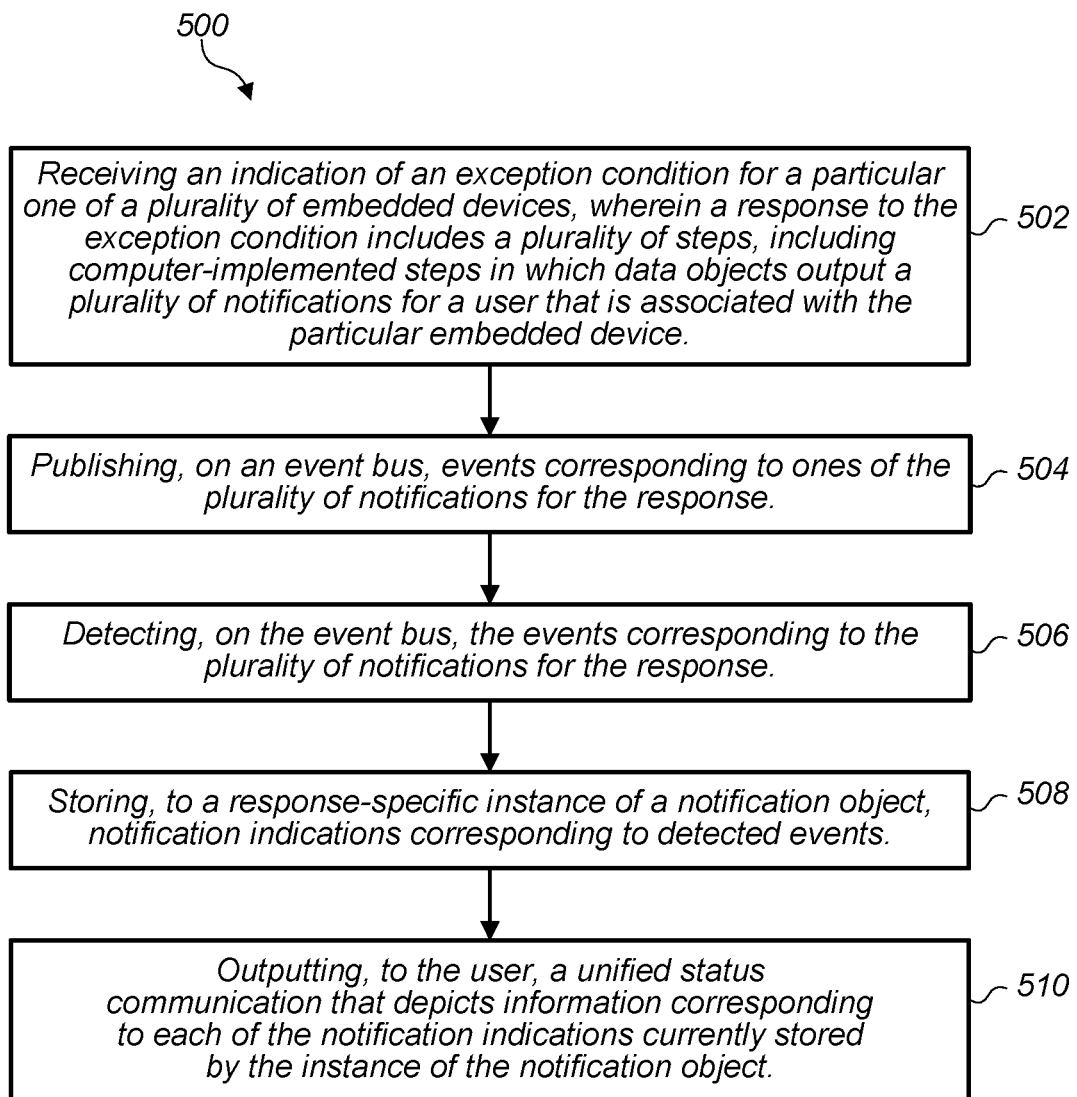
FIG. 5 is a flowchart illustrating an embodiment of a notification choreography method in accordance with the disclosed embodiments.
Figure 6:
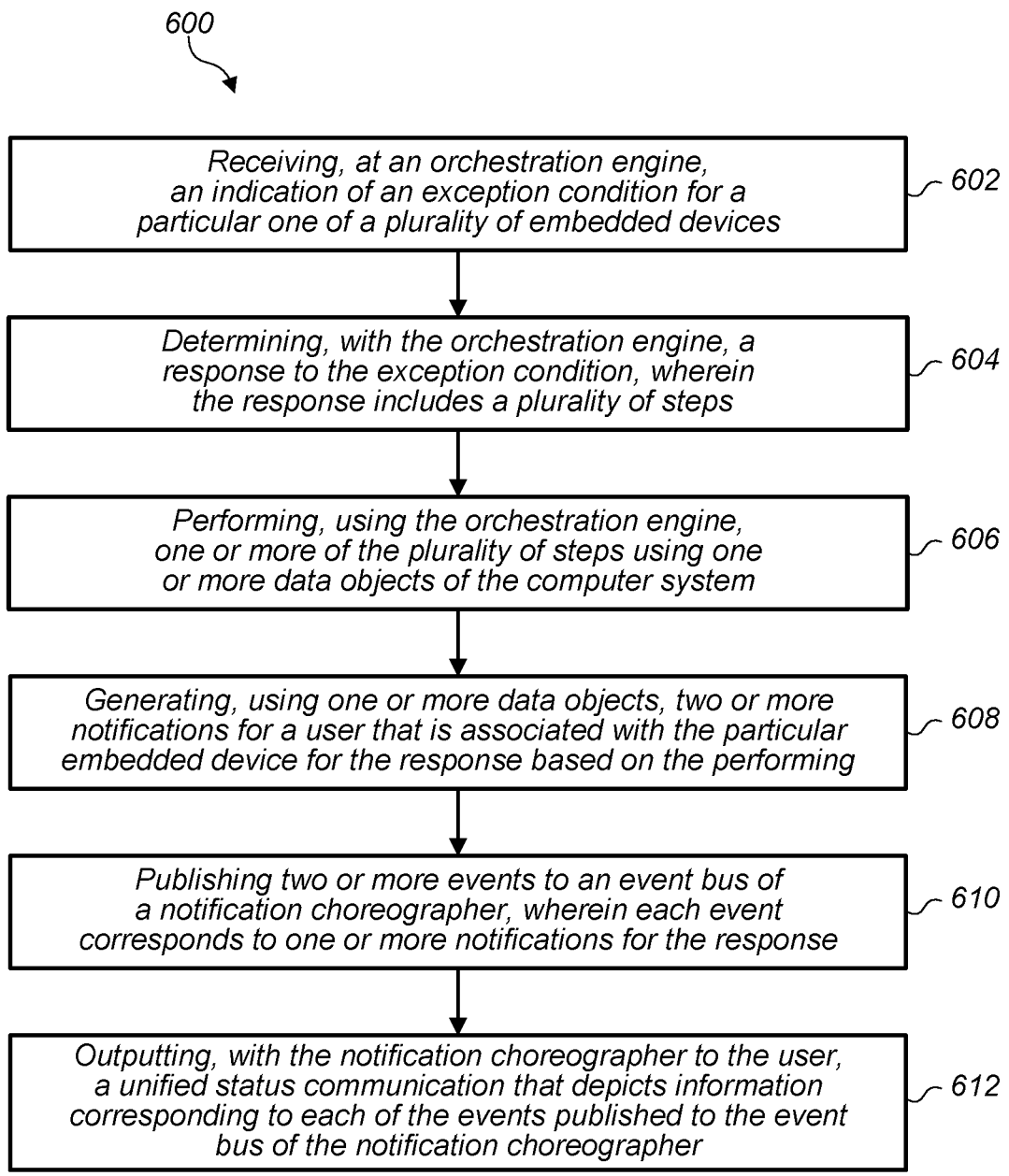
FIG. 6 is a flowchart illustrating an embodiment of a notification choreography method in accordance with the disclosed embodiments.

In various embodiments, computer system 100 performs the techniques discussed herein in connection to FIGS. 4, 5, and 6. Computer system 100 is configured to receive (e.g., over a network) indications 103 from embedded device 102, perform steps as part of a response to the exception condition, and output a unified status communication 104 to user 106. Computer system 100 includes an orchestration engine 110, a plurality of data objects 114, and a notification choreographer module 120 (also referred to herein as the notification choreographer 120).

In various embodiments, orchestration engine 110 implements one or more state machine algorithms configured to interact with, control, and/or service embedded devices 102. In various embodiments, computer system 100 prepares and performs (in whole or in part) a response to the indicated exception condition. The response includes a plurality of steps. In various embodiments, some (or all) of the plurality of steps of the response are performed by computer system 100 (e.g., communicating with embedded device 102 or user 106, controlling embedded device 102). In some embodiments, the plurality of steps includes interactions with embedded device 102 by other computer systems (not shown) and/or by technicians (or other personnel) (e.g., a technician performing maintenance on an embedded device 102). In some instances, all of the steps in the response are predetermined and the various steps are performed as predetermined (e.g., in cases where the exception condition relates to regular maintenance, the various steps of the response follow a predetermined maintenance procedure). In other instances, however, the various steps of the response are dynamically determined as the response is performed. For example, in instances where the exception condition relates to a malfunction of unknown cause, various steps in the response may be determined based on the results of previous steps not resolving the malfunction (e.g., subsequent steps to a remote diagnostic step not resolving the malfunction relate to sending a technician to physically inspect the particular embedded device 102A). Orchestration engine 110 uses various data objects 114 to perform steps of the response resulting in the data objects 114 causing to be output a plurality of notifications 115 for a user that is associated with the particular embedded device 102A shown in FIG. 1 as interaction 112. In various embodiments, orchestration engine 110 also interacts directly with notification choreographer 120 (e.g., by sending an indication 111 of an event for notification choreographer to publish to the event bus 122). Orchestration engine 110, data objects 114, and notifications 115 are discussed herein in further detail with reference to FIG. 2.

Notification choreographer 120 includes event bus 122 and one or more user notification objects 124. Notification choreographer 120 receives notifications 115 and publishes events corresponding to ones of the plurality of notifications 115 for the response to event bus 122. In various embodiments, events are published for all notifications 115 that are received, but in other embodiments, notification choreographer 120 determines to publish events for some notifications 115 but not others. Notification choreographer 120 detects on event bus 122 events corresponding to the plurality of notifications 115 for the response. Notification choreographer 120 also detects on the event bus 120, the events corresponding to the plurality of notifications 115 for the response and stores notification indications corresponding to the detected events to a response-specific instance of a user notification object 124, shown in FIG. 1 as interaction 123. In various embodiments, computer system 100 creates an instance of user notification object 124 associated with a particular response to a particular exception condition 103, stores notification indications with the instance of user notification object 124, and uses the instance of the user notification object 124 to output to user 106 a unified status communication 104 that depicts information corresponding to each of the notification indications currently stored by the instance of the user notification object 124. The event bus 122, user notification object 124, and interaction 123 are discussed herein in further detail with reference to FIG. 2.

Unified status communication 104 is output to user 106 by computer system 100 using notification choreographer 120 and depicts information corresponding notification indications stored by a particular instance of user notification object 124. In various embodiments, a particular unified status communication 104 depicts information corresponding to each of the notification indications currently stored by the instance of the user notification object 124. Thus, in embodiments, unified status communication 104 includes information to inform user 106 of the status of the response to an exception condition on a particular embedded device 102A. As discussed herein, in various instances, such information indicates the status of the case (e.g., is the case open or closed, has the case been escalated), some or all of the steps of the response that have been performed, the results of the performance of some or all of the steps, and/or one or more steps that are scheduled to be performed in the future. Unified status communication 104 is discussed herein in further detail with reference to FIGS. 3A and 3B.

In various embodiments, user 106 is a natural person who is associated with the particular embedded device 102A. In some of such embodiments, user 106 owns or rents particular embedded device 102A. In other embodiments, user 106 manages one or more embedded devices 102A for another (e.g., user 106 is employed as a property manager at an apartment complex with multiple smart refrigerators). In other embodiments, user 106 is an entity (e.g., a company, an organization) that owns, rents, and/or manages one or more embedded devices 102 including particular embedded device 102A. User 106 may receive unified status communication 104 in any of a number of ways (e.g., via a local area network, via a wide area network, via a cellular network) and via any of a number of channels (e.g., in an email, on a website, on a user interface of a computing device) and in any of a number of formats. As discussed herein, the manner in which user 106 receives unified status communication 104 may depend in part on the format of unified status communication 104 and what kind of information is contained in unified status communication 104 (e.g., audio information, visual information, tactile information, a combination).

Figure 3A:
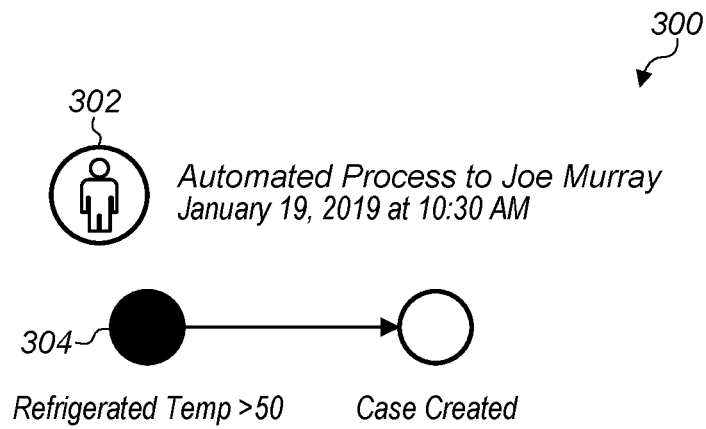
FIGS. 3A and 3B are examples of unified status communications output to a user in accordance with various embodiments.
Figure 3B:
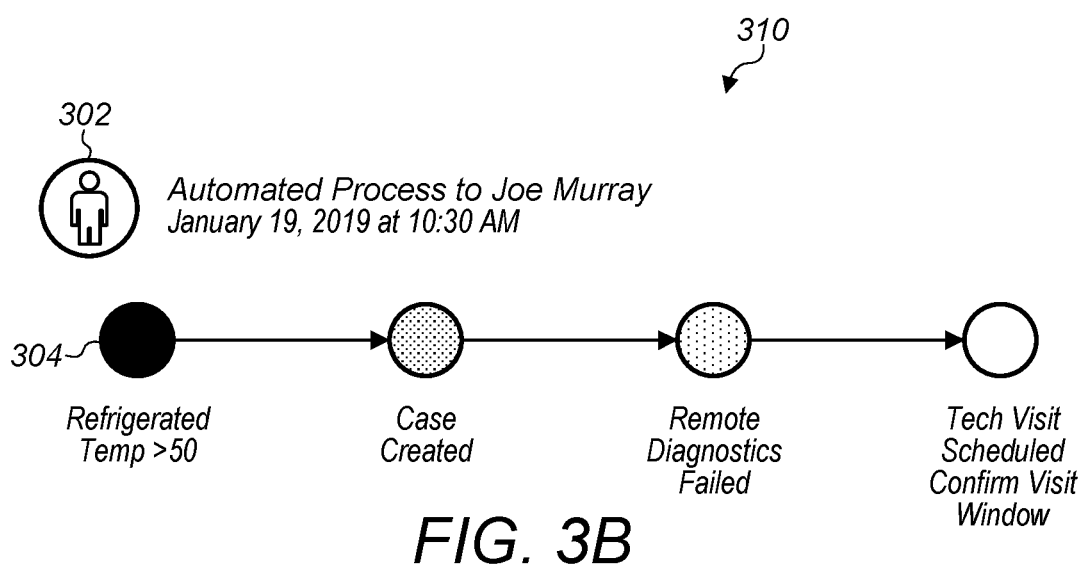

Accordingly, computer system 100 is configured to receive an indication 103 of an exception condition from a particular embedded device 102A, perform one or more steps in response to the exception condition, and communicate information about the response to the user 106 with a unified status communication 106. Compared to sending information to user 106 piecemeal as the various steps of the response are performed, by using a unified status communication 106 communication with user 106 is simplified and improved because user 106 is thereby presented with a more complete representation of the status of the response in a single communication. For example, if a particular refrigerator reports to computer system 100 that it is too warm, user 106 is presented with notification trails as shown in FIGS. 3A and 3B and discussed in connection to FIG. 7B rather than a flurry of separate notifications (potentially sent over separate channels) as discussed in connection to FIG. 7A.

Figure 2:
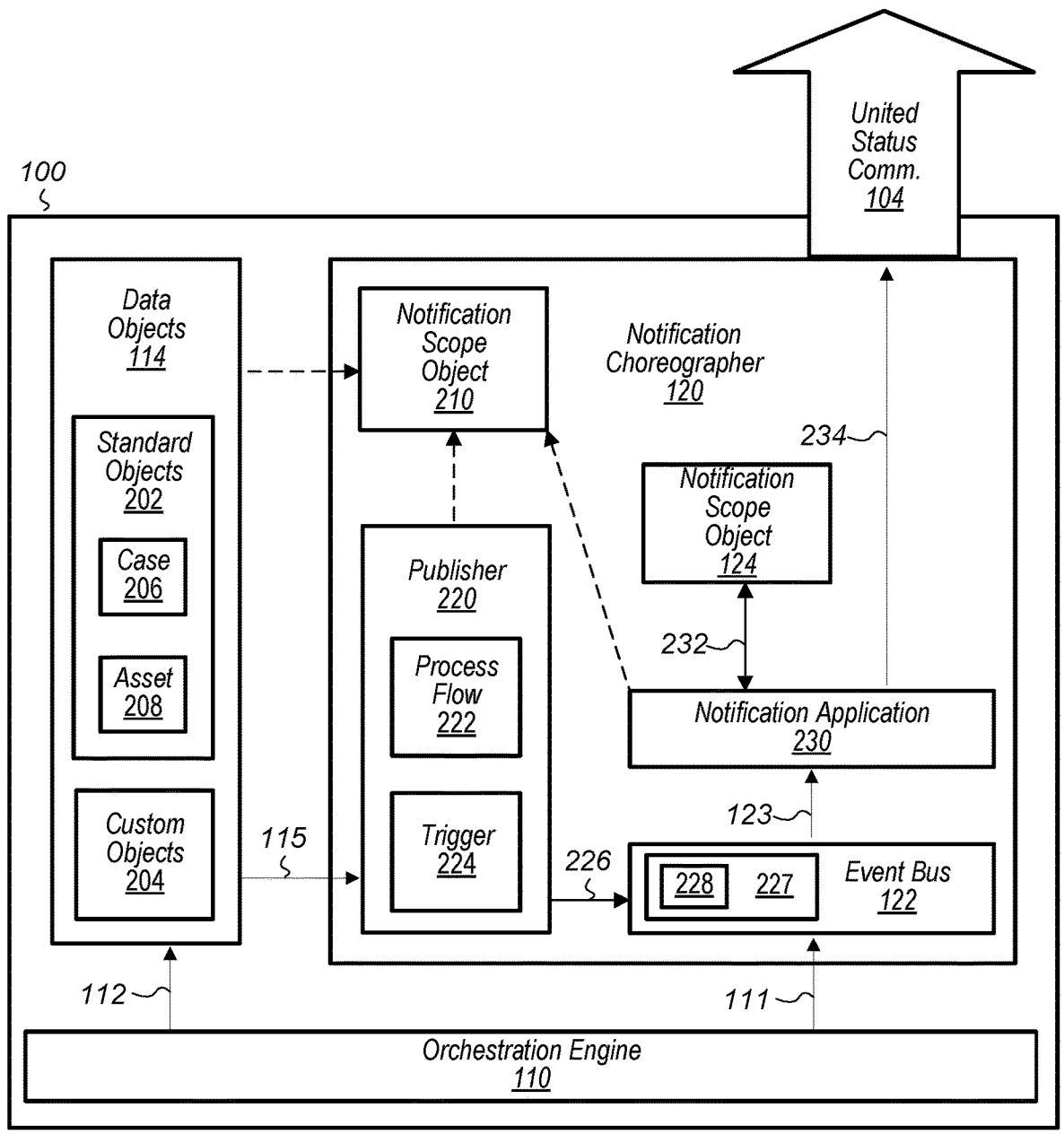
FIG. 2 is an expanded block diagram of the computer system of FIG. 1 in accordance with various embodiments.

Referring now to FIG. 2, an expanded block diagram of the computer system 100 of FIG. 1 is depicted in accordance with various embodiments. As shown in FIG. 2, computer system includes orchestration engine 110, data objects 114, and a notification choreographer 120 and computer system 100 outputs unified status communication 104. While only one of each is shown in FIG. 2, it will be understood that computer system 100 may include more than one of one of all of these modules. Further, computer system 100 may be implemented on a single computer system or multiple computer systems (e.g., implemented on a cloud or clouds). Computer system 100 may be accessible by a single entity (e.g., computer system 100 may be dedicated to the single entity) or it may be made available to any number of entities to be used to receive indications 103 from embedded devices 102 and communicate unified status communications 104 to various users (e.g., customers of the entities) as discussed herein.

Orchestration Engine

In various embodiments, orchestration engine 110 implements one or more state machine algorithms configured to interact with, control, and/or service embedded devices 102. In various embodiments, orchestration engine 110 performs a plurality of orchestrations for one or more entities. An orchestration is a combination of states, rules, actions, and/or transitions that carry out an entity's business logic and performs activities associated with providing user experience for the entity's clients or customers (e.g., user 106). For a particular embedded device 102, states reflect the overall status of the embedded device (e.g., a "healthy" state, a "warning" state, and "error" state). Rules are logics that tells the orchestration what to do (e.g., what kind of response to make upon receiving an indication 103) and are made up of events, conditions, actions, and optionally, transitions. Events are real-time events or periods of time that trigger a rule to be evaluated (e.g., receiving an indication 103 is an event). Actions are parts of rules that are triggered by an event (e.g., creating a service case to address a malfunction in embedded device 102 shown by indication 103). Conditions are additional criteria used within a rule. A transition is a move from one state to another, initiated by a triggering event or condition. Orchestrations, then, are used to determine what sort of response to take as a result of receiving indication 103 (or other communications from embedded devices 102). In some instances, the response includes a series of steps that resolve (or attempt to resolve) the exception condition. In other instances, the response includes a series of steps that include actions to take in response to the exception condition (but that do not resolve or attempt to resolve the exception condition). The response may include steps that include commands to the embedded device 102 (e.g., computer system 100 commands embedded device to perform an action or test). The response may include steps that include actions taken by personnel acting on the entity's behalf (e.g., computer system 100 communicates with a human technician who performs service steps on embedded device 102). As discussed herein, the particulars of given orchestration may be dictated by the entity managing the response to the exception condition. For example, if a particular entity is a refrigerator manufacturer that performs monitoring and service on the refrigerators that it sells to its customers, the particular entity may develop orchestrations to help ensure that its refrigerators are in good working condition and to facilitate service when a refrigerator requires maintenance.

Data Objects

In various embodiments, orchestration engine 110 uses various data objects 114 to perform steps of the response, shown in FIG. 2 as interaction 112. In various instances, interaction 112 includes orchestration engine 110 causing new instances of data objects to be created and/or passing information to instances of data objects 114. In various embodiments, data objects 114 include one or more standard objects 202 and/or one or more custom objects 204. In various embodiments, the standard objects 202 include a case object 206 and an asset object 208. A case object 206 represents a case that has been opened to resolve the exception condition shown in indication 103 and is useable to track the response to the exception condition. In such embodiments, for example, the case object 206 includes fields indicating when the case was opened, whether it is still open, user 106 (e.g., name, address, email, phone number, etc.), the entity managing the response, and/or a unique case identifier (ID) useable to differentiate a particular instance of a case object 206 from other case objects 206. In various embodiments, all other data objects 114 used to perform a particular response to a particular indication 103 reference the case object 206 associated with the particular response. In various embodiments discussed herein, a case object 206 includes one of more fields that define the various data objects 114 that cause the output of notifications 115 corresponding to information to be included in the unified status communication 106. That is, in some embodiments, a case object 206 directly defines which data objects' 114 notifications 115 publisher 220 should publish to event bus 122. Alternatively, as discussed herein, a case object 206 may include a field that refers to a notification scope object 210 that defines the various data objects 114 that output notifications 115 corresponding to information to be included in the unified status communication 106. That is, in some embodiments the case object 206 defines the notification scope and in other embodiments the case object 206 references to a notification scope object 210 that defines the notification scope.

An asset object 208 represents an individual embedded device 102 (e.g., a particular embedded device 102 that has been sold to user 106 and is installed in user 106's home). In such embodiments, the asset object 208 includes fields indicating, for example, the location of an embedded device 102, an account associated with the embedded device 102, a serial number of the embedded device 102, a user 106 associated with the embedded device 102, etc. Other standard objects 202 include but are not limited to work order objects used to represent field service work to be performed, order objects used to represent an order associated with a contract or an account, objects used to represent user 106, etc. An entity may customize a standard object 202 (e.g., by adding, removing, or modifying fields in a standard object) and thereby create custom objects 204. In such embodiments, prior to receiving the indication 103 of the exception condition, computer system 100 receives configuration information from the entity managing the response to the exception condition, and a custom data object 204 is configured accordingly. In embodiments where multiple entities have access to computer system 100, standard objects 202 are available to the multiple entities to user whereas custom objects 204 may be created or configured at a particular entity's behest and, in embodiments, are only available to entities designated by the particular entity.

As part of computer system 100 performing the response to indication 103, the various data objects 114 cause the output of a plurality of notifications 115 for user 106 that is associated with the particular embedded device 102A. In some embodiments, the data objects 114 (or an agent acting on data objects 114) outputs the notifications 115 to the publisher 220. In other embodiments, publisher 220 monitors the data objects 114 for changes and receives a notification 115 when from a data object 114 when the data object 114 changes. In various embodiments, all data objects 114 used in performing the response cause the output of notifications 115, but publisher 220 only publishes a subset of the received notification 115 to event bus 122 as discussed herein. In various embodiments, the notifications 115 include information reflecting one or more steps that has been performed and/or the result(s) of the step. For example, a notification 115 may reflect that an instance of a case object 206 has been created to track the response to indication 103. In another example, notification 115 may reflect that orchestration engine 110 commanded particular embedded device 102A to perform a self-diagnostic test, the results of the self-diagnostics, and/or whether performing the self-diagnostics resolved the exception condition. In still another example, notification 115 may reflect that the case in response to indication 103 has been escalated or closed. In another example, notification 115 may reflect that a case has been reassigned from one customer service agent at the entity ("Agent John") to another customer service at agent at the entity ("Agent Jane").

Notification Choreographer

Still referring to FIG. 2, in various embodiments, notification choreographer module 120 includes event bus 122, user notification object 124, notification scope object 210, publisher 220, and notification application 230. It will be understood that while only one of each is shown in FIG. 2, notification choreographer module 120 may include one or more of each of these components.

Event Bus, Event Channel, and Event Objects

Event bus 122 is a centralized publication platform accessible by various elements of computer system 100. As discussed herein, various components are operable to publish to event bus 122 including orchestration engine 110 and publisher 220. Additionally, various components of computer system 100 including notification application 230 are operable to read from event bus 122. In various embodiments, events are published to a particular event channel 227 on event bus 122. In various embodiments, events corresponding to a plurality of different entities are published to the same event bus 122, but the events associated with a given entity are distinguishable from events associated with other entities (e.g., because the event channel 227 is dedicated to a particular entity, because the event object 228 used to publish the event indicates with which entity it is associated directly or by referencing other data objects such as case object 206 or the notification scope object 210 that indicates with which entity the event object 228 is associated).

In various embodiments, events are published to event bus 122 (e.g., by publisher 220, by orchestration 110) on an event channel 227. In such embodiments, event channel 227 enables the publisher-subscriber paradigm and allows publisher 220 to publish generally such that one or more subscribers (e.g., notification applications 230) can subscribe to the event channel 227 and receive the events published to the event channel 227. In various embodiments, event channel 227 is defined by a data object (e.g., a data object 114) and a new instance of the event channel 227 is created for each response. In various embodiments, indication 111 is received by event bus 122 directly from orchestration engine 110. In response to receiving indication 111, a new instance of an event channel 227 (e.g., an event channel 227 associated with the entity managing the response to indication 103, an event channel 227 associated with a particular type of embedded device 102 such as a particular type of smart refrigerator) may be created on event bus 122. As discussed herein, in various embodiments, publisher 220 publishes events to the created instance of the event channel 227 as steps are performed and notification app 230 polls the created instance of the event channel 227 to detect events (e.g., event objects 228) to be used to generate the user notification object 124. As discussed herein in connection to FIG. 4, event channel 227 may be configured by the entity managing the response to the exception condition.

In various embodiments, events published to event bus 122 are defined by a respective event object 228. As shown in Table 1, in various embodiments, each event object 228 includes a reference to a case object 206 useable to track the particular response to a particular exception condition, a unique identifier for the particular embedded device 102A, and indicators of one or more of a priority of the response, whether the response has been escalated, and whether the response is closed. As shown in Table 1, event objects 228 may include other information such as the name of an event channel 227 on event bus 122 (e.g., an event channel 227 set up by the entity as discussed in connection to FIG. 4), a textual description of the particular kind of event, a reference to a notification scope object 210, an identifier of the particular embedded device 102A, etc.

TABLE 1

| Field Name | Type | Description |
|---|---|---|
| Name | Text | Name of event channel 227 |
| Description | Text | |
| Notification Scope | Lookup | Lookup to notification scope object 210 |
| Case ID | ID | Lookup to case object 206 |
| Asset ID | ID | Lookup to asset object 208 (ID of particular embedded device 102A that is not functioning.) |
| Case Status | Picklist | Case Status |
| Case Priority | Picklist | Case Priority |
| Case Escalated | Checkbox | Case Escalated |
| Case Closed | Checkbox | Case Closed |
| Resolution Task | Text Long | Description of task completed to be communicated to user 106. |

Notification Scope Object

In various embodiments, notification scope object 210 defines the various data objects 114 that cause the output of notifications 115 corresponding to information to be included in the unified status communication 104. In such embodiments, the notification scope object 210 defines which notifications 115 will be published (e.g., a notification 115 relating to the scheduling of a work order) and which notifications 115 will not be published (e.g., a notification 115 relating to the assignment of the response from Agent John to Agent Jane) (also referred to herein as the "notification scope"). In various embodiments, a particular case object 206 associated with a particular response references the particular notification scope object 210 used to define the notification scope for the particular response. In embodiments, a particular notification scope object 210 is associated with the particular entity managing the responses that use the notification scope defined by the particular notification scope object 210. In some embodiments, all responses associated with the particular entity use the same particular notification scope object 210. In other embodiments though, a particular entity may create multiple notification scope objects 210 to use to define different notification scopes for different embedded devices 102 or different types of embedded devices 102. For example, the if a particular entity manages responses to exception conditions for two types of devices (e.g., smart refrigerators and smart dishwashers), in various embodiment the particular entity defines a first notification scope object 210 used to define the notification scope for responses relating to smart refrigerators and a second notification scope object 210 used to define the notification scope for responses relating to smart dishwashers.

In various embodiments, the notification scope object 210 includes (but is not limited to) the fields shown in Table 2. In various embodiments, some of all of these fields are used to store configuration information entered by the particular entity with which the notification scope object 210 is associated as discussed below in reference to FIG. 4. The notification scope name and description fields are useable to store textual information about the notification scope object 210. The object list field stores a multi-value parameter (MVP) that refers to the various data objects 114 that cause the output of notifications 115 corresponding to information to be included in the unified status communication 104. The orchestration field stores a reference to the orchestration of orchestration engine 110 that is associated with the particular embedded device 102A and indication 103. The event object field stores a reference to the event object 228 that should be used to publish the appropriate notification 115.

TABLE 2

| Field Name | Type | Description |
| --- | --- | --- |
| Notification Scope Name | Text | |
| Description | Text | |
| Object List | MVP | Contains list of data objects 114 whose notifications 115 will be published |
| Orchestration | Lookup | Lookup to particular orchestration of orchestration engine 110 |
| Event Object | Lookup | Lookup to event object 228 to use for publication |

Publisher

In various embodiments, publisher 220 receives notifications 115 from data objects 114 and publishes (or does not publish as the case may be) the received notifications 115 to event bus 122 shown in FIG. 2 as interaction 226. In various embodiments, publisher 220 receives notifications 115 as result of the data objects 114 (or an agent or process acting on the data objects 114) sending the notification 115. In other embodiments, publisher 220 actively monitors one or more data objects 114 and notes changes to the data objects 114 as a notification 115. In either case, in various embodiments, publisher 220 determines whether and how an event for a particular notification 115 should be published to the event bus 122. In various embodiments, publisher 220 operates according to a publisher-subscriber paradigm in which publisher 220 publishes events to the event bus 122 without knowing the subscribers (e.g., one or more notification applications 230) that will receive the events.

In various embodiments where notifications 115 received by publisher 220 include a first set of notifications 115 that correspond to information to be included in the unified status communication 104 (e.g., a notification 115 corresponding the escalation of a case) and a second set of notification 115 that do not correspond to information to be included in the unified status communication 104 (e.g., a notification 115 corresponding to the reassignment of a case from Agent John to Agent Jane), publisher 220 publishes events corresponding to the first set of notifications 115 and not the second set of notifications 115. In various embodiments, publisher 220 references a notification scope object 210 to determine whether to publish an event corresponding to a particular notification 115 (e.g., by determining whether the particular notification 115 is associated with a data object 114 within the notification scope. For example, the notification scope object 210 may be referenced by a process flow 222 and/or trigger 224 as discussed below.

In various embodiments, the functions of publisher 220 are defined by one or more process flows 222 and/or one or more triggers 224. In various embodiments, the process flows 222 and/or triggers 224 define which data objects 114 to monitor for changes to generate notifications 115 and for which of these monitored data objects 114 to publish events, or which data objects 114 to expected to send their own notifications 115 to publisher 220. In some of such embodiments, the process flows 222 and/or triggers 224 reference the relevant notification scope object 210 to determine which data objects 114 are within the notification scope. In various embodiments, the process flows 222 and/or triggers 224 define to which event channel 227 to publish and/or which event object 228 to use when publishing an event corresponding to the notification 115 and how such event channel 227 and/or event object 228 should be used. Accordingly, process flows 222 and/or triggers 224 may, for example, reference a particular notification scope object 210 to determine to monitor a case object 206, detect a change in the case object 206 when the response has been escalated and note the change as a notification 115, and publish an event object 228 to a particular event channel 227 corresponding to the notification 115. As discussed herein, the published event object 228 may reference the notification scope object 210 and/or the particular case object 206.

In various embodiments, process flows 222 are defined (e.g., by the entity managing a particular response, as a default by the provider of computer system 100) using a selection of presented choices that define, for example, which data objects 114, event channel 227, and/or event object 228 should be used by the process flow 222. In various embodiments, triggers 224 are defined (e.g., by the entity managing a particular response, as a default by the provider of computer system 100) using scripts written in one or more scripting languages. These process flows 222 and triggers 224 may be configured and/or customized by the entity managing the particular response as discussed in reference to FIG. 4. Accordingly, an entity may control what events gets published to event bus 122 and the manner in which the events should be published.

Notification Application, User Notification Object, and United Status Communication In various embodiments, notification application 230 monitors event bus 122 to detect events corresponding to various notifications 115 relating to a particular response to a particular indication 103, shown in FIG. 2 as interaction 123. In various embodiments, notification application 230 does this by polling for event objects 228 on one or more event channels 227. Upon detecting an event (e.g., an event object 228 published to a monitored event channel 227), in various embodiments notification application 230 stores a notification indication corresponding to the detected event to a response-specific instance of a user notification object 124, shown in FIG. 2 as interaction 232. While in some embodiments, notification application 230 stores every event it detects in one or more response-specific instances of one or more notification scope objects 124, in other embodiments notification app 230 determines whether to store the detected event (e.g., by referencing notification scope object 210 to check whether the event corresponds to a data object 114 within the notification scope) before storing the detected event. In various embodiments, upon detecting a first event (e.g., an event object 228 published to a monitored event channel 227) corresponding to a particular response, notification application 230 creates a response-specific instance of the user notification object 124 and stores a notification instance corresponding to the first event to the response-specific instance of the user notification object 124. In such embodiments, upon detecting one or more subsequent events (e.g., event objects 228 published to a monitored event channel 227) corresponding to the response, the notification application 230 store notification instances corresponding to the one or more subsequent events to the response-specific instance of the user notification object 124.

In various embodiments, user notification object 124 stores notification indications corresponding to events detected by notification application 230. For each particular response, a response-specific instance of the user notification object 124 is used to store notification indications corresponding to that particular response. As discussed herein, a particular instance of a user notification object 124 is associated with a particular response by the particular instance of a user notification object 124 referencing the instance of case object 206 created for the particular response in various embodiments. Notification choreographer 120 (e.g., using notification application 230) uses a response-specific instance of a user notification object 124 to output a unified status communication 104 to user 106 for the response as discussed herein.

In various embodiments, user notification object 124 is a data object including (but not limited to) the fields shown in Table 3. When a response-specific instance of a user notification object 124 is created, some of the various fields are filled in as appropriate while others may be defined by the entity in advance during the configuration discussed in connection to FIG. 4. Accordingly, when a response-specific instance of a user notification object 124 is created (e.g., by notification application 230), a notification identifier is assigned and stored in the Notification ID field, a reference to the appropriate notification scope object 210 is stored in the Notification Scope Field, a reference to the appropriate case object 206 is stored in the Case ID field, and information about the contact/owner of the embedded device 102 (e.g., contact information for user 106) is stored in the Contact field. In various embodiments, notification indications are stored in the Notification Trail Feed field. In some of such embodiments, the response-specific instance of the user notification object 124 stores information in the Notification Trail Feed field in an XML schema. As discussed below in connection to FIGS. 3A and 3B, the XML schema is used to generate the unified status communication 104 in various embodiments. In such embodiments, the unified status communication 104 graphically depicts information corresponding to each of the notification indications currently stored by the instance of the user notification object 124 according to the XML schema. Further, in some embodiments, the Resolution Task field and the Name of Channel field store information that may be configured or customized as discussed in connection to FIG. 4. The Name of Channel defines one or more channels on which to output the unified status communication 104 (e.g., via email, via a notification to a mobile app, via a post on a website, a combination) in various embodiments.

TABLE 3

| Field Name | Type | Description |
| --- | --- | --- |
| Notification ID | Text | |
| Event ID | Lookup | Lookup to event object 228 that lead to the creation of the instance of the user notification object 124 |
| Notification Scope | Lookup | Lookup to notification scope object 210 |
| Case ID | ID | Lookup to case object 202 |
| Contact | ID | Contact/owner of embedded device 102 |
| Resolution Task | Text | Description of task completed. For communication to user 106. |
| Notification Trail Feed | Text Long | Long text that would store XML schema that would be used by the notification application 230 to create a unified status communication 104 |
| Name of Channel | MVP | Reference to transmission channel for unified status communication 104 |

In various embodiments, unified status communication 104 for a particular response is generated by notification application 230 using the response-specific instance of a user notification object 124 for the particular response, shown in FIG. 2 as interaction 234. Unified status communication 104 is discussed herein in further detail with reference to FIGS. 3A and 3B.

Accordingly, computer system 100 is configured to receive indication 103, determine and perform a response to the indication 103, and generate and output a unified status communication 104 for user 106 that informs user 106 of relevant steps that have been performed in a single message. In some embodiments, the unified status communication 104 obviates the need for a flurry of notifications about the performance of the various steps. In other embodiments, even if user 106 receives a multitude of unified status communications 104 (e.g., user 106 receives a unified status communication 104 for every event published to event bus 122), each unified status communication 104 itself provides an end-to-end view of all of the published notifications 115. In networks with tens, hundreds, or thousands of embedded devices 102 keeping track of the responses to exception conditions for multiple embedded devices 102 can be overwhelming to both the entities managing the response and users 106. By preparing unified status communications 104, an entity is able to provide a "one stop shop" for a user 106 to check the status of a response to an exception condition for one or more embedded devices 102. Further, the entity managing the response is able to improve the user experience by eliminating unnecessary user notifications (e.g., a reassignment of the response from Agent John to Agent Jane). Additionally, in some embodiments, a unified status communication 104 for a given user 106 may be tailored for that given user 106 based on information known about the given user 106. In some of such embodiments, this tailoring may include (but is not limited to): (a) adjusting the notification scope to include more notifications 115 (or fewer notifications 115), (b) adjusting the format of the unified status communication 104 (e.g., preparing an audio-only unified status communication 104 for a vision impaired user 106), or (c) adjusting how the unified status communication 104 is communicated to the given user 106 (e.g., emailing unified status communication 104 to some users 106, sending unified status communication 104 to other users 106 in an application notification). Further, because computer system 100 uses data objects 114, notification scope objects 210, event channels 227, event objects 228, and user notification objects 124 and some or all of these may be dedicated to, configured by, and/or customized by a particular entity managing responses to exception conditions for particular embedded devices 102, the provider of computer system 100 is able to make computer system 100 available to a plurality of entities such that each entity shares the computer system 100. But because the various data objects 114, notification scope objects 210, event channels 227, event objects 228, and user notification objects 124 may be dedicated to, configured by, and/or customized by a particular entity, computer system 100 is able to restrict the access according to a particular entity's instructions such that the receiving, determining, performing, generating, publishing, and outputting for each of the plurality of entities are separately performed such that information associated with each particular entity is not shared with other entities (or is shared as instructed by the particular entity).

Notification Trails

Referring now to FIG. 3A and FIG. 3B, two examples of unified status communications 106 represented as notification trails are shown. FIG. 3A depicts a notification trail 300 and FIG. 3B depicts a notification trail 310. Both notification trails 300, 310 include information 302 that pertains to the overall response and information 304 that pertains to the exception condition and the status of steps of the response. As discussed herein, the format of the trails 300, 310 is defined by the response-specific instance of the user notification object 124 (e.g., the XML schema in the Notification Trail Feed field) for the response in various embodiments. In such embodiments, notification application 230 generates the trails 300, 310 using information stored in the response-specific instance of the user notification object 124.

As shown in FIG. 3A, trail 300 includes information 302 indicating the name of user 106 ("Joe Murray") as well as the time and date the trail 300 was generated ("January 19, 2019 at 10:30 AM"). Information 302 may also include a photograph. In some embodiments, the photograph is a picture of user 106, but in other embodiments the photograph may be of the agent (e.g., an agent of the entity managing the response) assigned to the response or of the embedded device 102. Similar information 302 is shown in FIG. 3B, but the time and date shown in trail 310 are one hour after the time and date shown in trail 300. Other information may be included in information 302 in various embodiments, including information about the particular embedded device (e.g., serial number, model number, model name, etc.), an estimated time for resolution of the exception condition, information about the entity managing the response to the exception condition (e.g., name, contact information), etc.

In trail 300 and 310, information 304 includes information about the exception condition in the first "dot" ("Refrigerator temp>50") which shows the exception condition reported by particular embedded device 102A (which is a smart refrigerator in this example) in indication 103. In various embodiments as discussed herein, information in this first dot relates to indication 111 that was published to the event bus 122 directly by orchestration engine 110. Notification application 230 detected the event corresponding to indication 111, created a particular instance of a response-specific user notification object 124, and stored the message "Refrigerator temp>50" and corresponding XML code to generate the first dote in the response-specific user notification object 124. The second "dot" in information 304 shown in trails 300 and 310 indicates that a case (e.g., an instance of case object 206) has been created by computer system 100 in response to the exception condition. Trail 300 does not include further dots, which means that as of the time trail 300 was generated no other notifications 115 from data objects 114 within the notification scope have been received (e.g., the case could have been reassigned from Agent John to Agent Jane, but the trail 300 does not include this information) and/or no other events for the response have been published to event bus 122. In trail 310, the third dot indicates that "Remote Diagnostics Failed," which, as discussed below in connection to FIGS. 7A and 7B, indicates that commands issued to the smart refrigerator and the smart refrigerator's response were unable to resolve the exception condition. The fourth dot in trail 310 indicates that a technician visit has been scheduled and that user 106 is requested to confirm the technician's visit window. The second, third, and fourth dots correspond to events that were published to event bus 122 by publisher as a result of publisher receiving notifications 115 from various data objects 114. Notification indications for these published events were then stored to the response-specific user notification object 124 and included in the unified status communication 106 generated by notification application 230. Accordingly, the trails 300 and 310 indicate information about the exception condition, the response, the various steps that have been performed, indicate that input from user 106 is required, and whether the exception condition has been resolved.

While the unified status communications 106 are represented as notification trails 300 and 310 in FIGS. 3A and 3B, it will be understood that unified status communications 106 may be communicated to user 106 in any of a number of ways (e.g., graphically, textually, audibly, tacitly, a combination). For example, unified status communications 106 may be communicated using a text to voice interface for the visually impaired.

FIGS. 4, 5, and 6 illustrate various flowcharts representing various disclosed methods implemented with computer system 100. FIG. 4 is a flowchart illustrating an embodiment of a notification configuration method 400 depicting various actions performed with computer system 100. Method 400 depicts various actions that an entity (e.g., an entity managing responses to exception conditions for various embedded devices 102) takes to configure and/or customize the various orchestrations, data objects 114, notification scope objects 210, publisher 220, event channel 227 and event objects 228, notification application 230, and notification scope objects 124 disclosed herein. For clarify the actions performed at each block in method 400, an example of an entity configuring computer system 100 to respond to exceptions conditions at embedded devices 102 that are smart refrigerators, but it will be understood that the configurations and/or customizations discussed herein can be applied to a response to any embedded device 102.

At block 402, notification scope object 210 is customized to define the notification scope. At new notification scope object 210 is thereby created, or an existing notification scope object 210 is modified to define which data objects 114 are within the notification scope for the response to exception conditions at the smart refrigerators indicating that the smart refrigerator is too warm. At block 404, the event channel 227 is configured. The event channel 227 for notifications for smart refrigerators is given an identifier like number or a name (e.g., Notification_Choregraphy_Refrigerator) such that when an instance of event channel 227 is created, it is useable to receive event objects 208 that are published to the instance of the event channel 227. At block 406, the orchestration used by orchestration engine 110 is configured to include an output action such the orchestration engine 110 outputs notification 111 to event bus 122 and creates a new instance of event channel 227. In various embodiments, a new orchestration is created, but in other embodiments a preexisting orchestration is modified to create notification 111. At block 408, the user notification object 124 is configured. A default user notification object 124 may be customized by the entity to include additional information (e.g., the entity's name and contact information) and custom fields as desired. At block 410, the notification application 230 is configured. For example, the notification application 230 is configured to monitor the Notification_Choreography_Refrigerator event channel 227 for event objects 228. At block 412, the publisher 220 is configured, including creating one or more process flows 222 and/or triggers 224. For example, the entity may configure the process flows 222 and/or triggers 224 to publish event objects 228 to the event bus 122 when the following data objects 114 are changed as shown in Table 4. Accordingly, event objects 228 associated with notifications 115 from case objects 206 are published when a (1) a case is created, (2) a case is escalated, and (3) when a case is closed; event objects 228 associated with notifications 115 from asset objects 208 are published when remote diagnostics are performed; and event objects 228 associated with notifications 115 from work order objects are published when (1) a service appointment is scheduled and (2) a service appointment is modified.

TABLE 4

| Data Object 114 | Publish event object 228 when . . . |
| --- | --- |
| Case object 206 | 1. A case is created<br>2. A case is escalated<br>3. A case is closed |
| Asset object 208 | 1. Remote diagnostics are performed |
| Work Order object | 1. A service appointment is scheduled<br>2. A service appointment is modified |

FIG. 5 is a flowchart illustrating an embodiment of a notification choreography method 400 including actions taken by computer system 100 using notification choreographer 120 as a result of receiving an indication 103 of an exception condition. At block 502, notification choreographer 120 receives an indication 103 of an exception condition for a particular one of a plurality of embedded devices 102, wherein a response to the exception condition includes a plurality of steps, including computer-implemented steps in which data objects 114 output a plurality of notifications 115 for a user 106 that is associated with the particular embedded device 102A. At block 504, notification choreographer 120 publishes, on an event bus 122, events corresponding to ones of the plurality of notifications 115 for the response. At block 506, notification choreographer 120 detects, on the event bus 122, the events corresponding to the plurality of notifications 115 for the response. At block 508, notification choreographer 120 stores, to a response-specific instance of a user notification object 124, notification indications corresponding to detected events. At block 510, notification choreographer 120 outputs, to the user 106, a unified status communication 104 that depicts information corresponding to each of the notification indications currently stored by the instance of the user notification object 124.

FIG. 6 is a flowchart illustrating an embodiment of a notification choreography method 500 including actions taken by computer system 100 using orchestration engine 110, data objects 114, and notification choreographer 120 as a result of receiving an indication 103 of an exception condition. At block 602, computer system 100 receives, at an orchestration engine 110, an indication 103 of an exception condition for a particular one of a plurality of embedded devices 102. At block 604, computer system 100 determines, with the orchestration engine 110, a response to the exception condition, wherein the response includes a plurality of steps. At block 606, computer system 100 performs, using the orchestration engine 110, one or more of the plurality of steps using one or more data objects 114 of the computer system 100. At block 608, computer system 100 generates, using one or more data objects 114, two or more notifications 115 for a user 106 that is associated with the particular embedded device 102A for the response based on the performing. At block 610, computer system 100 publishes two or more events to an event bus 122 of a notification choreographer 120, wherein each event corresponds to one or more notifications 115 for the response. At block 612, computer system 100 outputs, with the notification choreographer 120 to the user 106, a unified status communication 104 that depicts information corresponding to each of the events published to the event bus 122 of the notification choreographer 120.

In an illustrative example of FIGS. 5 and 6, a particular embedded device 102 (e.g., a smart refrigerator) reports to computer system an exception condition (e.g., that the smart refrigerator's internal temperature is over 50 degrees Fahrenheit) in indication 103. After receiving the indication 103, the orchestration engine 110 publishes notification 111 to event bus 122 of notification choreographer 120. Orchestration engine 110 creates an instance of a case object that includes a reference to the appropriate orchestration. In various embodiments, case object 206 references notification scope object 210 to determine notification scope, the identify the type of event object 228 to use for publication, and the event channel 227 to use for publication. Orchestration engine 110 accesses the asset object 208 for the particular embedded device 102A, commands the particular embedded device 102A to perform a diagnostic test, and receives the results of the diagnostic, and updates the asset object 208 accordingly. Orchestration engine 110 then creates a work order object to manage a technician visit to the particular embedded device 102. Publisher 220 monitors the case object 206, asset object 208, and work order object (as dictated by notification scope object 210 or as dictated by the notification scope defined by case object 206) and receives notifications 115 of the creation of the case object, the failure of remote diagnostics to resolve the exception condition, and the creation of a work order and the resulting need to confirm a technician visit window. Publisher 220 creates event objects 228 for each of these notifications 115 and publishes them to the event bus 122 using the event channel 227 indicated in the event objects 228.

Notification application 230 regularly polls the event channel 227 on event bus 230 and detects the notification 111 and published event objects 228. In response to detecting the notification 111 indicating the exception condition, notification application 230 creates a new instance of the appropriate user notification object 124 for the response and stores a notification indication (e.g., in the XML schema) corresponding to the notification 111 in the response-specific instance of the user notification object 124. In response to detecting the three event objects 228, notification application 230 adds notification information for each detected event object 228 in the response-specific instance of the user notification object 124. Notification application 230 then generates a unified status communication 106 using the response-specific instance of the user notification object 124, and the unified status communication 106 is output to the user 106 including information corresponding to: (1) the exception condition, (2) the creation of a case in response to the exception condition, (3) the failure of remote diagnostics to resolve the exception condition, and (4) that a technician visit should be scheduled. An example of a unified status communication with this information is shown in FIG. 3B herein.

Figure 7A:
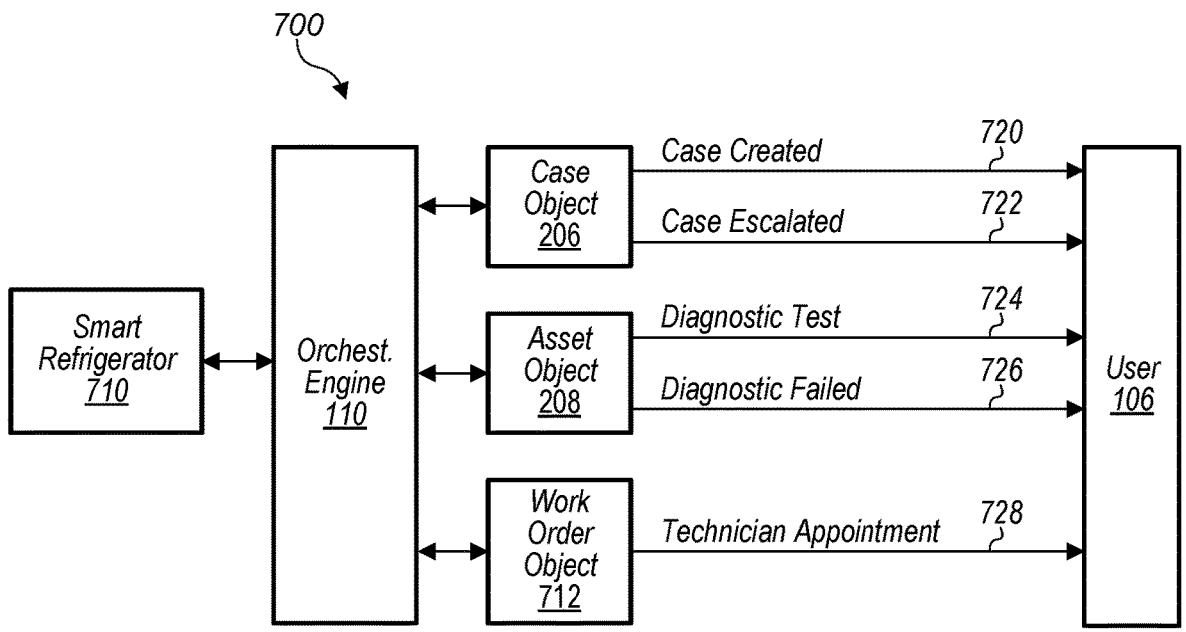
FIGS. 7A and 7B depict block diagrams that illustrate information flows resulting from an exception condition being received by computer system of FIG. 1.
Figure 7B:
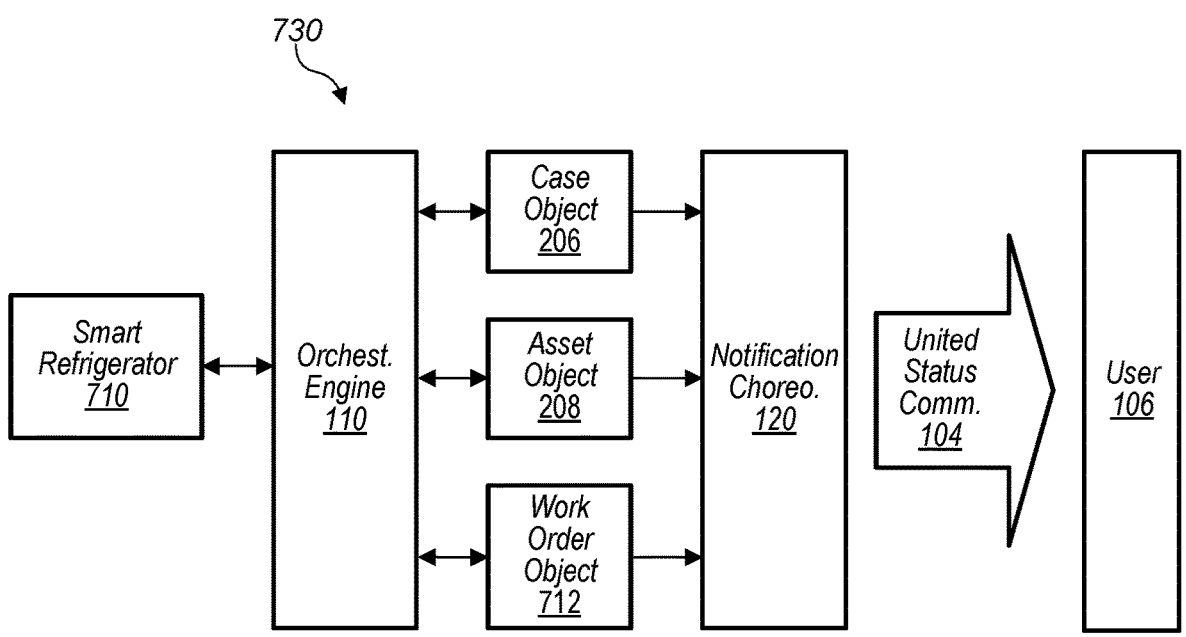

FIGS. 7A and 7B depict block diagrams that illustrate information flows resulting from an indication 103 of an exception condition being received by computer system 100. FIG. 7A depicts an information flow 700 that results in embodiments where notification choreographer 124 does not create a unified status communication 104 whereas FIG. 7B depicts an information flow 730 that results in embodiments where notification choreographer 124 creates a unified status communication 104. In both flows 700 and 730, smart refrigerator 710 (e.g., a particular embedded device 102A) communicates with orchestration engine 110 including sending indication 103 of an exception condition of the smart refrigerator 710. As discussed herein, an orchestration running on orchestration engine 110 responds to communications with smart refrigerator 710 and orchestration 110 creates or modifies various instances of data objects 114 including case object 206, asset object 208, and work order object 712. As each data object 114 is modified, a notification 115 may be created as discussed herein (e.g., by the data objects 114, by a publisher 220 monitoring the data objects 114, or by another agent monitoring the data objects 114).

In flow 700 depicted in FIG. 7A, five notifications 115 are created as a result of the creation or modification to data objects 114 and each are communicated separately to user 106. Thus, user 106 receives a case created message 720 when case object 206 is created and a case escalated message 722 when case object 206 is escalated. User 106 receives a diagnostic test message 724 when an asset object 208 changes to show that a diagnostic test has been performed and user 106 receives a diagnostic failed message 726 when an asset object 208 changes to show that the diagnostic did not fix the exception condition. User 106 receives a technician appointment message 728 when a work order object 712 changes to show that a technician appoint has been scheduled. Each of the messages 720-728, however, might be communicated over a single channel (e.g., user 106 receives five emails to their email address) or each message might be communicated over different channels (e.g., some in emails, others in application notifications, and others via messages on a website).

In contrast to flow 700, in flow 730 depicted in FIG. 7B, the various notifications 115 generated as a result of creation of or modifications to the data objects 114 are received by notification choreographer 120 and output via a unified status communication 104 as discussed herein. Accordingly, user 106 does not receive a flurry of message 720-728 and instead receives the unified status communication 104.

Exemplary Computer System

Figure 8:
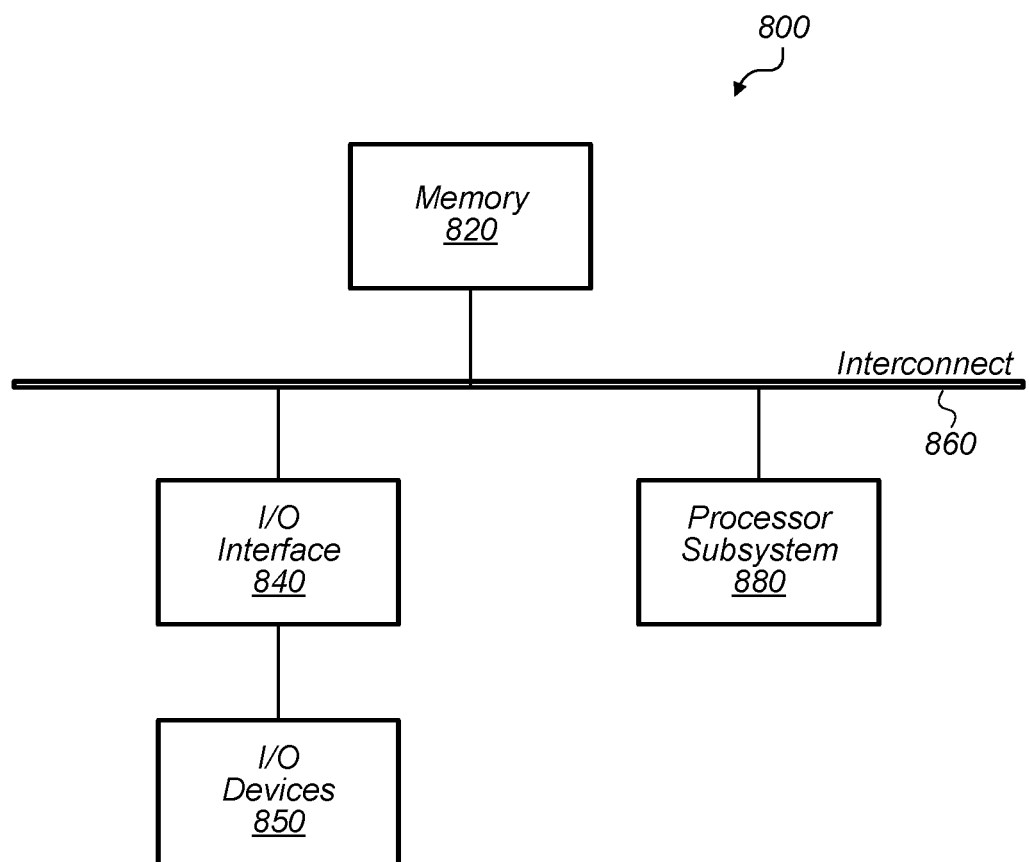
FIG. 8 is a block diagram of an exemplary computer system, which may implement various components of FIGS. 1 and 2.

Turning now to FIG. 8, a block diagram of an exemplary computer system 800, which may implement computer system 100 and/or the computer systems included in the embedded devices 102 is depicted. Computer system 800 includes a processor subsystem 860 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 860 may include one or more processors or processing units. In various embodiments of computer system 800, multiple instances of processor subsystem 860 may be coupled to interconnect 860. In various embodiments, processor subsystem 860 (or each processor unit within 860) may contain a cache or other form of on-board memory.

System memory 820 is usable to store program instructions executable by processor subsystem 860 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 860 and secondary storage on I/O Devices 850 (e.g., a hard drive, storage array, etc.). In some embodiments, these other forms of storage may also store program instructions executable by processor subsystem 860.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   receiving, at a computer system, an indication of an exception condition for a particular one of a plurality of computing devices, wherein a response to the exception condition includes a plurality of steps, including computer-implemented steps in which data objects cause outputting of a plurality of notifications for a user that is associated with the particular one of the plurality of computing devices;
   publishing, at the computer system on an event bus, events corresponding to ones of the plurality of notifications for the response;
   detecting, by the computer system on the event bus, the events corresponding to the plurality of notifications for the response;
   storing, by the computer system to a response-specific instance of a user notification object, notification indications corresponding to detected events; and
   outputting, by the computer system to the user, a unified status communication that depicts information corresponding to each of the notification indications currently stored by the instance of the user notification object.

2. The method of claim 1, further comprising:
storing, at the computer system, a notification scope object that defines the various data objects that output notifications corresponding to information to be included in the unified status communication; and
wherein a first data object of the data objects is a case object useable to track the response to the exception condition, wherein the case object includes a unique case identifier (ID); and
wherein the publishing includes publishing each event as an event object that refers to the notification scope object and the unique case ID.

3. The method of claim 1, further comprising:
storing, at the computer system, a notification scope object that defines the various data objects that output one or more notifications corresponding to information to be included in the unified status communication; and
wherein the publishing includes, for each event, determining that the event corresponds to a notification that was output by a data object that is one of the various data objects defined by the notification scope object.

4. The method of claim 1,
wherein the plurality of computing devices communicates with the computer system over a wide area network; and
wherein the exception condition is an indication of a malfunction in the particular one of the plurality of computing devices and ones of the plurality of steps include steps to remedy the malfunction.

5. The method of claim 1, wherein the storing includes:
upon detecting a first event corresponding to the plurality of notifications for the response:
creating the response-specific instance of the user notification object, and
storing a notification instance corresponding to the first event to the response-specific instance of the user notification object on the computer system; and
upon detecting one or more subsequent events corresponding to the plurality of notifications for the response:
storing notification indications corresponding to the one or more subsequent events to the response-specific instance of the user notification object on the computer system.

6. The method of claim 1, wherein the plurality of notifications for a user include a first set of notifications that correspond to information to be included in the unified status communication and a second set of notification that do not correspond to information to be included in the unified status communication; and wherein the publishing includes publishing events corresponding to the first set of notifications and not the second set of notifications.

7. The method of claim 1,
wherein a first data object of the data objects is a case object useable to track the response to the exception condition, wherein the case object includes a unique case identifier; and
wherein the response-specific instance of the user notification object references the case object.

8. The method of claim 1, further comprising:
providing access to the computer system to a plurality of entities, wherein each of the plurality of entities manages a plurality of responses to a plurality of exception conditions for a plurality of computing devices; and
prior to receiving the indication of the exception condition, receiving, at the computer system, configuration information from a particular entity managing the response to the exception condition;
wherein one of more of the data objects are is a custom data object, wherein content of the custom data object and access to the custom data object is configured based on the configuration information received from the particular entity.

9. A non-transitory, computer-readable medium storing instructions that when executed by a computer system cause the computer system to perform operations comprising:
receiving, at a computer system, an indication of an exception condition for a particular one of a plurality of computing devices, wherein a response to the exception condition includes a plurality of steps, including computer-implemented steps in which data objects cause outputting of a plurality of notifications for a user that is associated with the particular one of the plurality of computing devices;
publishing, at the computer system on an event bus, events corresponding to ones of the plurality of notifications for the response;
detecting, by the computer system on the event bus, the events corresponding to the plurality of notifications for the response;
storing, by the computer system to a response-specific instance of a user notification object, notification indications corresponding to detected events; and
outputting, by the computer system to the user, a unified status communication that depicts information corresponding to each of the notification indications currently stored by the instance of the user notification object.

10. The computer-readable medium of claim 9, wherein a first data object of the data objects is a case object that refers to a notification scope object, wherein the notification scope object defines the various data objects that output notifications corresponding to information to be included in the unified status communication.

11. The computer-readable medium of claim 9, wherein a first data object of the data objects is a case object that defines the various data objects that output notifications corresponding to information to be included in the unified status communication.

12. The computer-readable medium of claim 9, wherein the response-specific instance of the user notification object includes:
an indication of a notification scope object notification that defines the various data objects that output notifications corresponding to information to be included in the unified status communication;
a reference to a first data object of the data objects that is a case object useable to track the response to the exception condition;
an indicator of the user that is associated with the particular one of the plurality of computing devices; and
indicators of one or more channels on which to output the unified status communication.

13. The computer-readable medium of claim 9, wherein the response-specific instance of the user notification object stores information in an XML schema, and wherein the outputting includes generating the unified status communication to graphically depict information corresponding to each of the notification indications currently stored by the instance of the user notification object according to the XML schema.

14. The computer-readable medium of claim 9, wherein the unified status communication graphically depicts the information corresponding to each of the notification indications currently stored by the instance of the user notification object in chronological order, wherein the information shows, for each event published to the event bus, a completion status for one or more of the computer-implemented steps of the response.

15. A method comprising:
receiving, at an orchestration engine of a computer system, an indication of an exception condition for a particular one of a plurality of computing devices,
determining, with the orchestration engine of the computer system, a response to the exception condition, wherein the response includes a plurality of steps;
performing, using the orchestration engine, one or more of the plurality of steps using one or more data objects of the computer system;
generating, using one or more data objects of the computer system, two or more notifications for a user that is associated with the particular one of the plurality of computing devices for the response based on the performing;
publishing two or more events to an event bus of a notification choreographer module, wherein each event corresponds to one or more notifications for the response; and
outputting, with the notification choreographer module to the user, a unified status communication that depicts information corresponding to each of the events published to the event bus of the notification choreographer module.

16. The method of claim 15, further comprising:
storing, at the computer system, a notification scope object that defines the various data objects that output notifications corresponding to information to be included in the unified status communication; and
wherein the publishing includes, for each event, determining that the event corresponds to one or more notifications that was output by a data object that is one of the various data objects defined by the notification scope object.

17. The method of claim 16, wherein the particular one of the plurality of computing devices is a first type of device and wherein the notification scope object defines the various data objects that output notifications corresponding to information to be included in unified status communications corresponding to computing devices that are the first type of device.

18. The method of claim 16, wherein the response to the exception condition is associated with a particular entity, the method further comprising:
receiving, from the entity, customizations to one or more of the one or more data objects, the unified status communication, and the notification scope object.

19. The method of claim 15 further comprising
prior to receiving the indication of the exception condition, receiving, at the computer system, configuration information from an entity managing the response to the exception condition;
prior to receiving the indication of the exception condition, based on the configuration information, creating a platform event channel associated with the entity; and
creating, by the orchestration engine of the computer system in response to receiving the indication of the exception condition, an instance the platform event channel associated with the response to the exception condition;
wherein the publishing includes publishing to the instance of the platform event channel associated with the response to the exception condition.

20. The method of claim 15 further comprising
providing access to the computer system to a plurality of entities, wherein each of the plurality of entities manages a plurality of responses to a plurality of exception conditions for a plurality of computing devices;
wherein the receiving, determining, performing, generating, publishing, and outputting for each of the plurality of entities are separately performed such that information associated with each particular entity of the plurality of entities is not shared with other entities of the plurality of entities.

* * * * *